US012752973B2

(12) United States Patent
Steber et al.

(10) Patent No.: US 12,752,973 B2
(45) Date of Patent: Oct. 6, 2026

(54) TRANSPORT CONTAINER AND CONTAINER ARRANGEMENT

(71) Applicant: BS Systems GmbH & Co. KG, Zusmarshausen (DE)

(72) Inventors: Matthias Steber, Langenneufnach (DE); Reiner Gonitianer, Dillingen (DE)

(73) Assignee: BS Systems GmbH & Co. KG, Zusmarshausen (DE)

( * ) Notice: Subject to any disclaimer, the term of this patent is extended or adjusted under 35 U.S.C. 154(b) by 0 days.

(21) Appl. No.: 18/887,270

(22) Filed: Sep. 17, 2024

(65) Prior Publication Data

US 2025/0121991 A1 Apr. 17, 2025

(30) Foreign Application Priority Data

Oct. 16, 2023 (DE) ..................... 10 2023 128 317.0

(51) Int. Cl.
*B65D 21/02* (2006.01)
*B65D 43/16* (2006.01)
(Continued)

(52) U.S. Cl.
CPC ......... *B65D 43/22* (2013.01); *B65D 21/0223* (2013.01); *B65D 21/0224* (2013.01);
(Continued)

(58) Field of Classification Search
None
See application file for complete search history.

(56) References Cited

U.S. PATENT DOCUMENTS

D419,768 S 2/2000 Richardson
6,082,539 A * 7/2000 Lee ........................ B25H 3/021
206/821
(Continued)

FOREIGN PATENT DOCUMENTS

AT 7816 U1 * 9/2005 ......... B65D 21/0215
DE 202006001657 U1 5/2006
(Continued)

OTHER PUBLICATIONS

Search Report dated Nov. 28, 2024 for European Patent Application No. 24189962.4.
(Continued)

*Primary Examiner* — Mollie Impink
(74) *Attorney, Agent, or Firm* — Fleit Intellectual Property Law; Paul D. Bianco

(57) ABSTRACT

A transport container for mounting on a support structure has a lower part; an upper part, which is connected to the lower part via a hinge; a closure element for securing the upper part in a closed position; and a retaining element for fixing the transport container to the support structure. The invention a transport container enables simple locking of the upper container part and securing to a support structure, as well as unlocking and releasing, in particular independently of each other, by configuring the closure element and the retaining element as segments of a securing element arranged on the lower part that can be actuated decoupled from each other. The elastically deflectable closure element has a locking tab for engagement in a locking recess of the upper part and the elastically deflectable retaining element has a locking element for engagement in a retaining recess of the support structure.

18 Claims, 8 Drawing Sheets

(51) Int. Cl.

| | |
|---|---|
| ***B65D 43/22*** | (2006.01) |
| *B25H 3/00* | (2006.01) |
| *B25H 3/02* | (2006.01) |

(52) U.S. Cl.
CPC ............ *B65D 43/164* (2013.01); *B25H 3/003* (2013.01); *B25H 3/02* (2013.01); *B65D 2251/1058* (2013.01); *B65D 2543/00194* (2013.01)

(56) References Cited

U.S. PATENT DOCUMENTS

| | | | | |
|---|---|---|---|---|
| D569,616 | S | 5/2008 | Lin | |
| D627,967 | S | 11/2010 | Kuhis | |
| 8,875,888 | B2 * | 11/2014 | Koenig | B65D 21/0223 206/508 |
| 9,131,770 | B2 | 9/2015 | Stegherr | |
| D750,890 | S | 3/2016 | Quehl | |
| D759,975 | S | 6/2016 | Zozin | |
| D799,822 | S | 10/2017 | Kanda | |
| D801,685 | S | 11/2017 | Mang | |
| D805,774 | S | 12/2017 | Sun | |
| D841,981 | S | 3/2019 | Kögel | |
| D841,982 | S | 3/2019 | Kögel | |
| 10,405,626 | B2 | 9/2019 | Gonitianer | |
| D872,471 | S | 1/2020 | Zhao | |
| D873,004 | S | 1/2020 | Shpilzer | |
| 10,710,770 | B2 | 7/2020 | Kögel | |
| 10,829,269 | B2 | 11/2020 | Gonitianer | |
| 10,870,513 | B2 | 12/2020 | Gonitianer | |
| D906,669 | S | 1/2021 | Kuhis | |
| D918,580 | S | 5/2021 | Kögel | |
| 11,072,461 | B2 | 7/2021 | Gonitianer | |
| 11,279,518 | B2 | 3/2022 | Kögel | |
| D996,803 | S | 8/2023 | Jiang | |
| D1,059,829 | S | 2/2025 | Camp | |
| 2020/0078929 | A1 * | 3/2020 | Liu | B65D 21/0223 |
| 2021/0387325 | A1 | 12/2021 | Heath | |

FOREIGN PATENT DOCUMENTS

| | | | |
|---|---|---|---|
| DE | 102016112853 | A1 | 1/2018 |
| DE | 10 2018 121 479 | A1 | 3/2020 |
| DE | 20 2009 018 588 | U1 | 3/2021 |
| EP | 0 555 533 | B1 | 8/1993 |
| EP | 3501756 | A1 | 6/2019 |

OTHER PUBLICATIONS

Search Report for German Patent App. No. 10 2023 128 317.0 filed Oct. 16, 2023.
Product Catalog “Work clever, Click Together”, L-BOXX, Pro Click, BS Systems, 52 pages, 2024.
Notification of Reasons of Refusal, dated Sep. 2, 2025 for Japanese Application No. 2024-150596.
Office Action dated Dec. 10, 2025 for Canadian Application No. 3,248,057.
“Montageanleitung XL-BOXX Deckeleinlage klein”, [Posted Online on youtube.com], [Publish Date Feb. 21, 2025], [Retrieved Online on Nov. 12, 2025], https://www.youtube.com/watch?v=CMjghjUBuUk (Year: 2025).
“L-BOXX Contractor Compact Stackable IP65 Waterproof Toolbox”, [Posted Online on amazon.com.be], [First Available Date Aug. 29, 2025], [Retrieved Online on Nov. 12, 2025], https://www.amazon.com.be/-/en/6100001672/dp/BOFP5H26PT?source= ps-sl-shoppingads-Ipcontext&ref_=fplfs&th=1 (Year: 2025).
“L-BOXX Set”, [Posted Online on amazon.de], [First Available Date Aug. 23, 2020], [Retrieved Online on Nov. 12, 2025]. https://www.amazon.de/-/en/L-BOXX%C2%AE-Bosch-Sortimo-Black-Transport/dp/B07KZD6N4H (Year: 2020).

* cited by examiner

TRANSPORT CONTAINER AND CONTAINER ARRANGEMENT

FIELD OF THE INVENTION

The invention relates to a transport container and a container arrangement comprising a support structure and a transport container releasably attachable to the support structure.

BACKGROUND

A stackable case for transportable machine tools with a box- or shell-like lower part and a raisable lid hinged to the lower part is known from EP 0 555 533 B1. For vertical stacking of several cases, the lower part of an upper case is positioned on the lid of the lower case arranged directly there below. In order to guarantee a correct relative positioning between the cases during stacking, complementary centering plugs are arranged on the base of the lower part and on the top of the lid, specifically, downwardly protruding projections molded onto the base of the lower part, which can be inserted into recesses in the lid. Several connectors are distributed along the wall periphery of the lower part of the case for releasably and firmly connecting the cases of the case stack. In particular, first connectors in the form of a tab-like pivoting part are arranged in the area of the top of the lower part and second connectors are arranged in the form of rib-like protrusions in the area of the lower part near the base. The tab-like pivoting part is then mounted to pivot on the lower part around an axis perpendicular to the stacking direction and connectable to a rib-like protrusion of the lower part of a mounted case. During coupling of the lower part of a mounted case via the tab-like pivoting part of the lower part of the lower case, coupling of the lid of the lower case also occurs simultaneously via third connectors arranged on the lid, which are also designed as rib-like protrusions. Coupling of just the lid is also possible by arranging the tab-like pivoting part on the lower part so as to be movable parallel to the stacking axis, i.e., without simultaneously coupling same to the rib-like protrusions of the lower part of a mounted case. The tab-like pivoting part is consequently movable between a raised position, which enables a coupling position between two cases mounted one upon the other, and a position that enables a locked position for fixing the lid relative to the corresponding lower part.

A container arrangement is also known from DE 10 2018 121 479 A1 with at least two vertically stackable containers, comprising a box-like lower part and a lid pivotably attached thereto. The containers then have a multipart pin recess opening to accommodate pin protrusions on the base part of an open container in the region of a rear lid back panel that is molded above the top surface. A front coupling connection between stacked containers can be made through a sliding bar movable perpendicular to the stacking direction and arranged on the front side. In particular, by pushing in the direction of the lid back panel the sliding bar then engages with a hook end over two attachment lips in the underside of the upper container as well as an attachment lip in the lid of the lower container parallel thereto. By deflecting the sliding bar away from the front plate, the hook end disengages from the attachment lips so that the front coupling connection is raised and the containers can be released from each other. A releasable connection of the body and lid can be made via a pivot bar that is separate from the sliding bar.

A drawback in solutions known from the prior art is that locking or unlocking of the lid by a user, as well as securing of stacked containers in a coupled state, is time-consuming and may require several manual operations, for example, first holding a locking element for a lid in a position in which the lid can be closed, in order to then lock the lid via the locking element. Furthermore, several costly to produce or complex locking and coupling structures for the containers are often required in order to lock a lid, on the one hand, and to secure the coupling of two containers, on the other.

SUMMARY

Based on the above, one aspect of the invention relates to a transport container that can be arranged on a support structure, for example, another transport container, which has a locking mechanism to secure a upper container part on a lower container part, as well as a coupling mechanism to secure the container on the support structure, in which case locking of the upper container part on the lower container part as well as securing of the container on the support structure occur simply and in which simple unlocking of the upper container part secured on the lower container part, as well as simple releasing of the container from the secured arrangement on the support structure are possible, in particular independently of each other. In addition, the locking mechanism and the coupling mechanism should be advantageous to manufacture, in particular, have the fewest possible components with the simplest design. In addition, a container arrangement comprising such a transport container as well as a support structure are to be provided.

Accordingly, disclosed herein are a transport container and a container arrangement. Advantageous embodiments and useful modifications of the invention are also disclosed herein.

The transport container according to the invention for releasable attachment to a support structure, for example, to another container having the support structure or an adapter plate having the support structure includes a lower part and an upper part that encloses a receiving space together with the lower part and is pivotably connected to the lower part via a hinge for optionally closing or opening the receiving space. The transport container, in particular, can be a container for tools or tool parts, for example, a bit box. The lower and upper parts, which are preferably made of a plastic, for example, polypropylene, can then be designed as box- or shell-like and each can enclose its own receiving space, in particular a receiving space open to one side. However, it is also possible in principle for the upper part or the lower part to be designed in the form of a lid that does not enclose its own receiving space. To releasably secure the upper part in the closed position that seals off the receiving space, when sitting on the lower part, the transport container also has a closure element movable between a closed position and an open position. The transport container also includes a retaining element movable between a retaining position and a release position, via which the transport container can be fixed in a coupling position in which the lower part is arranged with the underside thereof on the support structure, in particular resting on the support structure. In particular, the underside of the lower part then has at least one coupling element, which is coupled to at least one corresponding mating element of the support structure, in particular engaged therewith. The coupling element, for example, can be an engagement bar that engages in the coupling position in a correspondingly configured engagement recess of the support structure.

The closure element and the retaining element according to the invention are two elastically deflectable segments of a securing element arranged on the lower part that can be actuated independently or decoupled from each other. The elastic deflectability of the closure and retaining element is then to be understood with respect to a normal or ordinary actuation of these elements by a user for opening the transport container or releasing the transport container from a support structure, in which case after the force causing the deflection has been eliminated, the closure or retaining element returns to the corresponding base position. The securing element is then preferably formed in one piece, in particular integrally or in one part, in particular preferably of plastic, for example, acrylonitrile-butadiene-styrene.

In particular, the closure element according to the invention, which is elastically deflectable from the closed position that forms the base position, has a locking tab or locking bar, which engages in a corresponding locking recess of the upper part in the closed position when the upper part is arranged in the closed position that seals off the receiving space. Owing to the configuration of the closed position as the base position, the locking tab is also held in this engaging arrangement. The upper part is arranged on the lower part is thus secured against opening. Accordingly, during deflection of the closure element into the opening position, the locking tab disengages from the locking recess so that the transport container can be opened by pivoting the upper part around the pivot axis formed by the hinge. During closure of the upper part, the closure element is preferably briefly deflected from the closure position by contact of the locking tab against the outside of the locking recess, which preferably has a correspondingly designed lead-in chamfer, in order to then automatically lock into the locking recess in the fully closed transport container, i.e., without requiring any additional manual operation by the user.

The retaining element, which is elastically deflectable from the retaining position forming the base position, also includes a locking element, in particular a locking hook, for releasable engagement in a retaining recess of the support structure. In particular, the locking element engages in the retaining recess of the support structure in the retaining position when the transport container is arranged in the coupling position and the retaining element is in the retaining position. By the locking element being engaged in the retaining recess, the transport container is fastened to the support structure so as to secure same from being lifted off or removed. Owing to the configuration of the retaining element with the retaining position forming the base position, the locking element is then also held in the position that engages in the retaining recess. To release the transport container from the support structure, the retaining element is deflected from the retaining position into the release position so that the locking element disengages from the retaining recess of the support structure. The transport container can then be removed from the support structure, for example, by disengaging an engagement bar serving as coupling element and arranged on the underside of the lower part from a corresponding engagement recess in the support structure. In the aforementioned embodiment with the coupling element configured as an engagement bar, when the transport container is arranged in the coupling position on the support structure, the engagement bar is preferably initially inserted into the engagement recess of the support structure and the transport container then pivoted in the direction of the support structure so that the locking element engages in the retaining recess. The retaining element is then preferably deflected briefly from the retaining position by contact of the locking element with the outside of the retaining recess, which can have a corresponding lead-in chamfer, and then locked automatically in the retaining recess when the transport container is completely arranged in the coupling position, without requiring any further manual operation by a user.

By decoupling the retaining element and the closure element, when one element is actuated or deflected, there is no deflection or actuation of the other element. The retaining element remains in the retaining position that forms the base position when the closure element is deflected into the opening position. When the transport container is opened, it therefore remains securely fastened to a support structure. Similarly, when the retaining element is deflected into the release position, the closure element remains in the closed position so that opening of the transport container does not occur during removal of the transport container from the support structure. Owing to the configuration of the transport container according to the invention, in which the closure element and the retaining element are designed as segments or areas of a single securing element that can be operated when decoupled from each other, a configuration is obtained for a locking mechanism for releasable locking of the upper container part on the lower container part, as well as a securing mechanism for releasable securing of the transport container on a support structure, which is advantageous to manufacture and design and simple to actuate, in which, in particular, the locking of the transport container and the securing of same to the support structure occur separately from each other.

In an advantageous embodiment of the transport container, the upper part is pivotably connected to the lower part via a hinge arranged on a first side of the lower part, in particular the back of the lower part, for optional closing or opening of the receiving space, and the securing element is arranged on a second side of the lower part, in particular a front of the lower part opposite the back. This arrangement of the hinge and the securing element having the closure element provides a transport container that is advantageous to design and manufacture, which enables simple actuation of the closure element and opening of the transport container and holds the upper part securely in the closed position.

In an advantageous embodiment, the closure element and the retaining element are arranged on opposite sides of the securing element. The locking tab is then preferably arranged on or near the top of the securing element facing in the direction of the upper part, and the locking element, in particular the locking element designed as a locking hook, is arranged on or near the underside of the securing element facing the direction of a support structure. In this way, an embodiment of the securing element that is advantageous in terms of design is provided together with the closure and retaining elements decoupled from each other, which enables secure retaining of the upper part in the closed position as well as the transport container on the support structure. In particular, the aforementioned embodiment also enables simple actuation of the closure and retaining element occurring separately from each other.

The retaining element is preferably arranged between two vertically running separation slots of the securing element. The separation slots then extend inward in particular from the outer edge of the side of the securing element having the retaining element, for example, to about one-third or one-half the height of the securing element. The retaining element is preferably bounded laterally by the two vertically running separation slots. The retaining element is then connected to the rest of the securing element via the connection area arranged between the two separation slots. Decoupling of the retaining element from the closure element is ensured by the separation slot. To support decoupling, the securing element can also have a separation bar, in particular on the connection area arranged between the two separation slots, which rest against the lower part or is contact with the lower part during actuation of the retaining element or the closure element. The described embodiment provides a robust and simple to manufacture securing element with a retaining element that can be actuated decoupled from the closure element. In particular, the separation slots can then also be simply introduced after producing a base element for the securing element.

In an advantageous embodiment, the securing element is rigidly connected to the lower part, i.e., in particular fixed and immovable at the connection site. This ensures that the securing element is not unintentionally moved during actuation of the retaining element or the closure element, thereby adversely affecting the actuation or deflection of the retaining element or the closure element. The securing element is preferably mounted releasably on the lower part via at least one fastening device. The releasable arrangement also makes it particularly easy to replace a defective securing element. The fastening device is then preferably formed by a fastening hook arranged on the securing element and a fastening recess arranged on the lower part and designed for hooking the fastening hook. The fastening hook and/or the fastening recess can be a component of the securing element or the lower part, i.e., designed integral therewith. However, subsequent incorporation of the fastening hook and/or the fastening recess on the securing element or lower part is also possible. In an alternative embodiment, it is also possible to provide the fastening recess on the securing element and the fastening hook on the lower part of the transport container. It is particularly preferable for the securing element to be mounted on the lower part via two fastening devices. The retaining element is then preferably arranged between the at least two fastening devices and separated therefrom, in particular by two vertically running separation slots. Owing to the above-described embodiments, the securing element can be mounted simply and securely on the lower part. To guarantee secure positioning of the securing element on the lower part, in particular during actuation of the closure or retaining element, the securing element can have an installation bar arranged between two fastening devices, which lies on or near the lower part in a securing element mounted on the lower part. In addition, or alternatively, the outer edge of the side of the securing element that has the retaining element, can be formed as an installation edge lying against or next to the lower part. The securing element then preferably has one installation edge on each side of the retaining element.

In an advantageous embodiment, the closure element has an engagement section for pulling the closure element from the closed position outward into the opening position. The engagement section is then arranged in particular above the locking tab in the case of a locking tab arranged on the top of the securing element or formed by the region of the securing element arranged above the locking tab. In another advantageous embodiment, the retaining element has an actuation section to force the retaining element from the retaining position to the release position, in particular on the side facing away from the transport container or facing outward. The retaining element, and therefore the locking element, is consequently deflected in the direction of the transport container when a force is applied against the actuation section. Simple actuation of the closure and retaining element is provided by the described embodiments. In addition to the described embodiment, a correspondingly reversed configuration of the closure and retaining element is also conceivable in principle, in particular such that the retaining element has an engagement section to pull the retaining element into the release position and the closure element has an actuation section to force it into the opening position.

In an advantageous embodiment, the underside of the lower part has at least one coupling element that is coupled to the mating element of the support structure in the coupling position, in particular engaged therewith. The underside of the lower part preferably has an engagement bar, which in the coupling position engages in the corresponding engagement recess of the support structure. For simple, rapid and secure arrangement of the transport container on the support structure, the at least one engagement bar is arranged on or near the back having the hinge, in particular on the back edge of the lower part. In an advantageous embodiment, the lower part has several engagement bars for engagement in a correspondingly configured engagement recess of the support structure. The engagement recess can then also have several sections, each of which enables accommodation of one engagement bar. The engagement bars are then preferably arranged along the back, in particular along the edge of the underside of the lower part running along the back.

In an advantageous embodiment, the transport container is configured as a stackable transport container. The top of the upper part then has a support structure designed in particular for stacking, for example, of an equivalent, identical transport container for arrangement of the lower part of the equivalent transport container thereon. The upper part then preferably has at least one retaining recess for the locking element of the equivalent transport container. With particular preference, the top also has at least one mating element, in particular in the engagement recess, for coupling with a coupling element arranged on the underside of an equivalent transport container, in particular an engagement bar. In another advantageous embodiment, the top of the upper part has at least two such mating elements, in particular two engagement recesses, which preferably can also serve as retaining recesses. A configuration of the retaining recess analogous to or as an engagement recess represents a particularly preferred variant, since in this way insertion of both the locking tab and the locking element into the engagement recess and into the retaining recess considered as such is possible. The retaining recess in this advantageous embodiment can consequently also be used as an engagement recess. The reverse situation applies for the engagement recess. An engagement bar of an equivalent transport container then engages in the coupling position into a first engagement recess and the fastening hook of the equivalent transport container engages in a second engagement recess serving as retaining recess. In the aforementioned embodiment, an equivalent transport container can be mounted on the upper part in two positions, in particular rotated by 180° relative to each other.

In a particularly preferred embodiment of the stackable transport container, the top of the upper part has at least two protrusions extending upward relative to a lid surface, in particular a front protrusion arranged on or next to the front having the securing element and a rear protrusion arranged on or next to the back having the hinge. The protrusions then each have at least one engagement recess, which is opened preferably in the direction of the other protrusion or directed inward from the perspective of the transport container. Simple and secure arrangement of an equivalent transport container in the coupling position is thus provided and therefore simple and secure stacking of several equivalent transport containers.

Another aspect of the invention relates to a container arrangement that includes a transport container as described above as well as at least one support structure having at least one retaining recess for releasable mounting of the transport container thereon. The support structure can then preferably be arranged on another in particular equivalent transport container or on an adapter plate. The support structure also preferably has a mating element suitable for coupling with a coupling element of the transport container, in particular an engagement recess that is suitable for receiving an engagement bar arranged on the underside of the transport container.

BRIEF DESCRIPTION OF THE DRAWINGS

These and additional features as well as advantages and effects of the transport container according to the invention, as well as the container arrangement according to the invention are apparent from the following illustrative embodiment described in greater detail with reference to the accompanying drawings. In the drawings.

DETAILED DESCRIPTION

Figure 1:
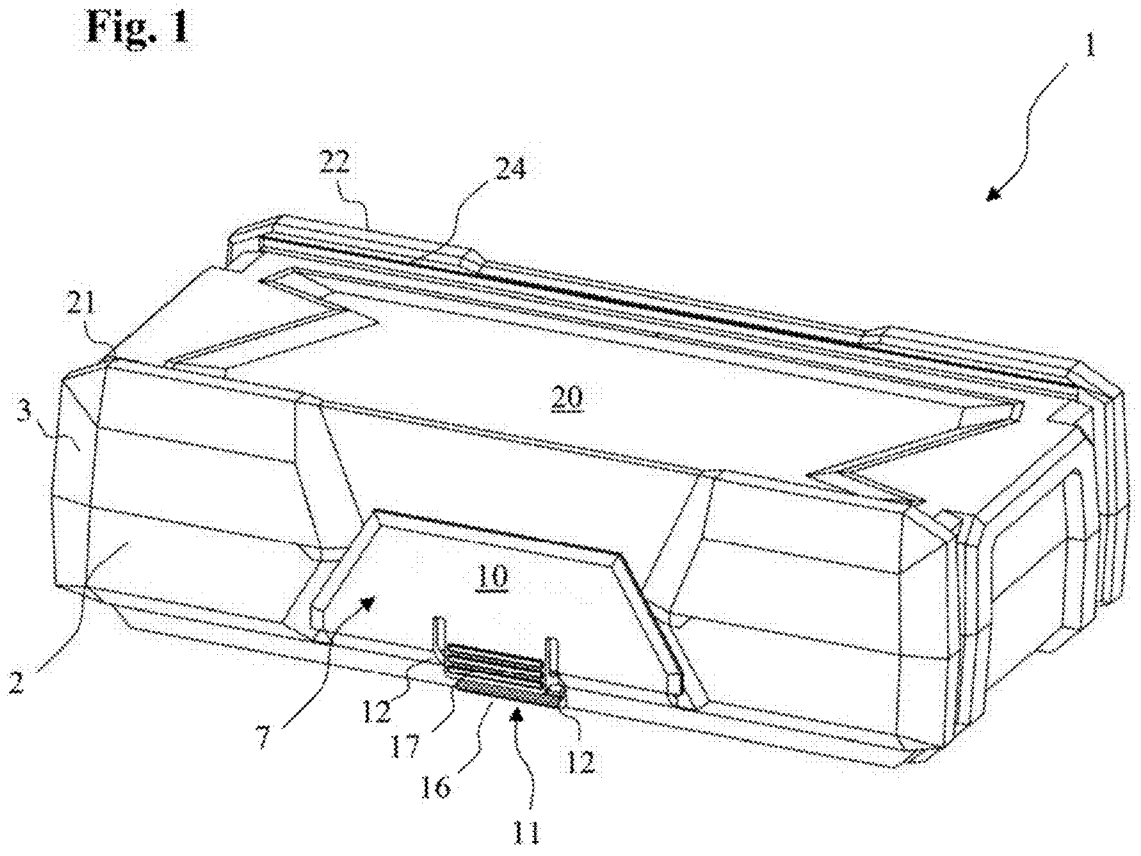
FIG. 1 shows a first perspective view of a stackable transport container in a closed position.
Figure 2:
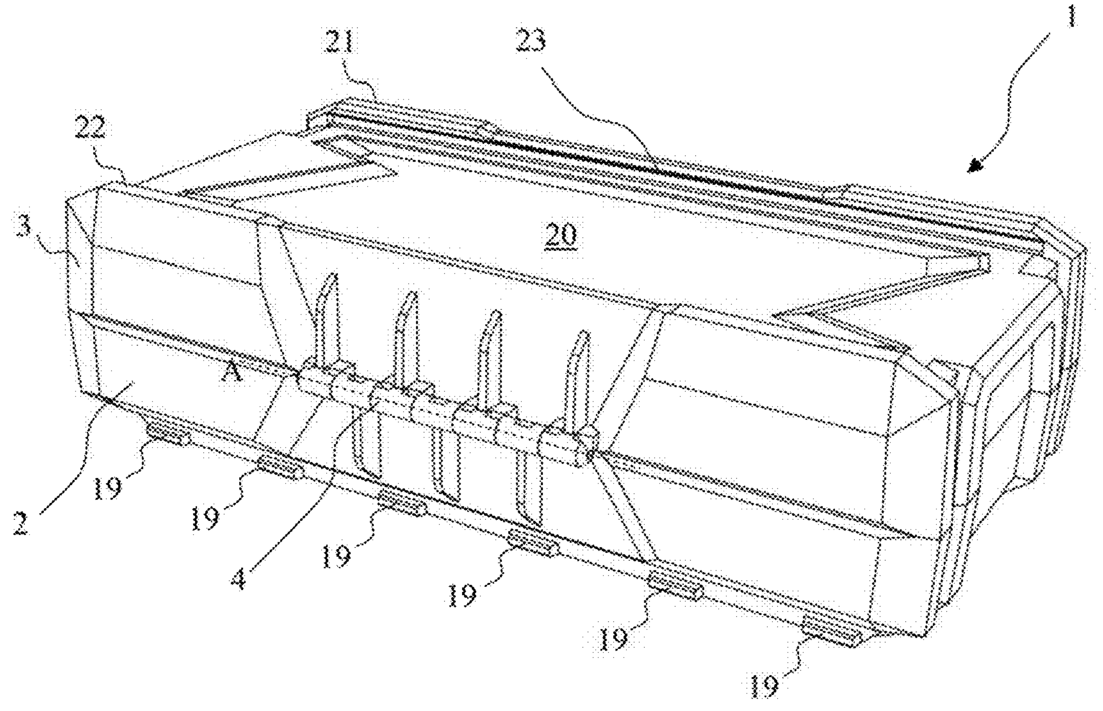
FIG. 2 shows a second perspective view of the stackable transport container of FIG. 1.
Figure 3:
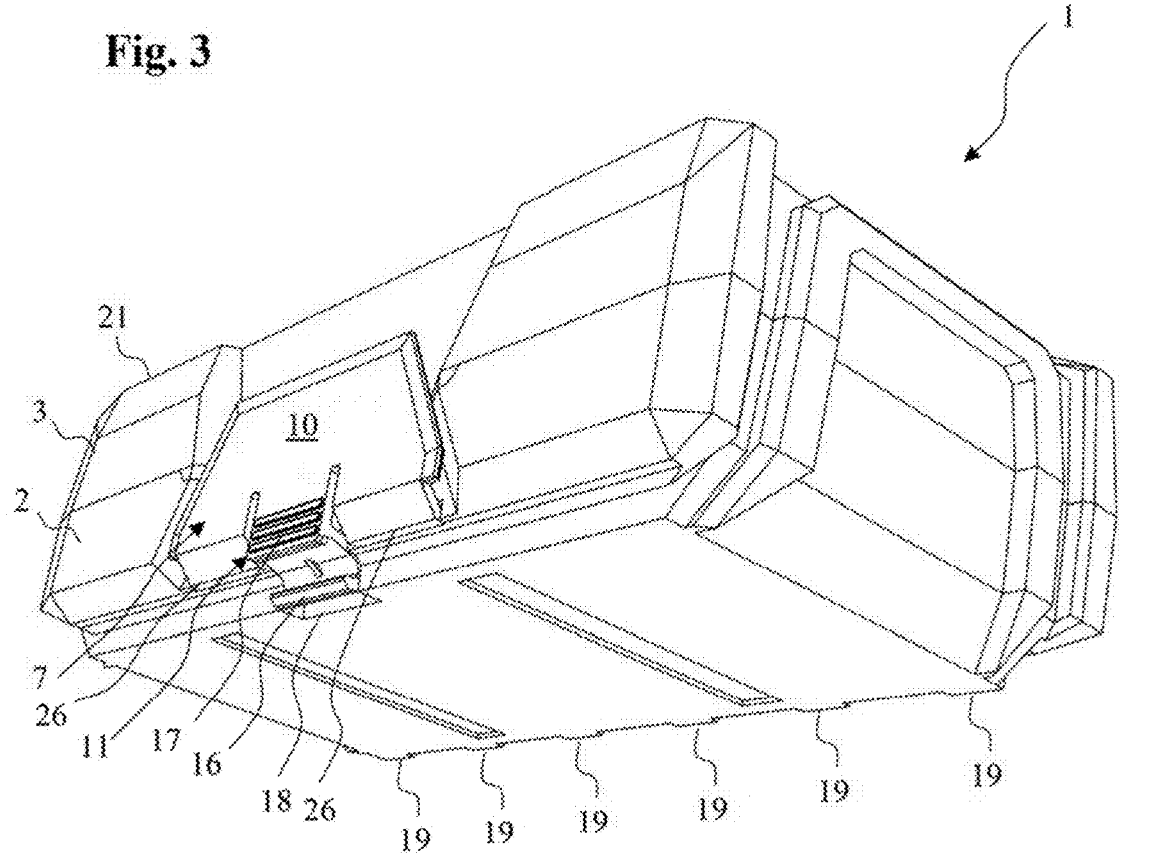
FIG. 3 shows a third perspective view of the stackable transport container of FIG. 1.
Figure 4:
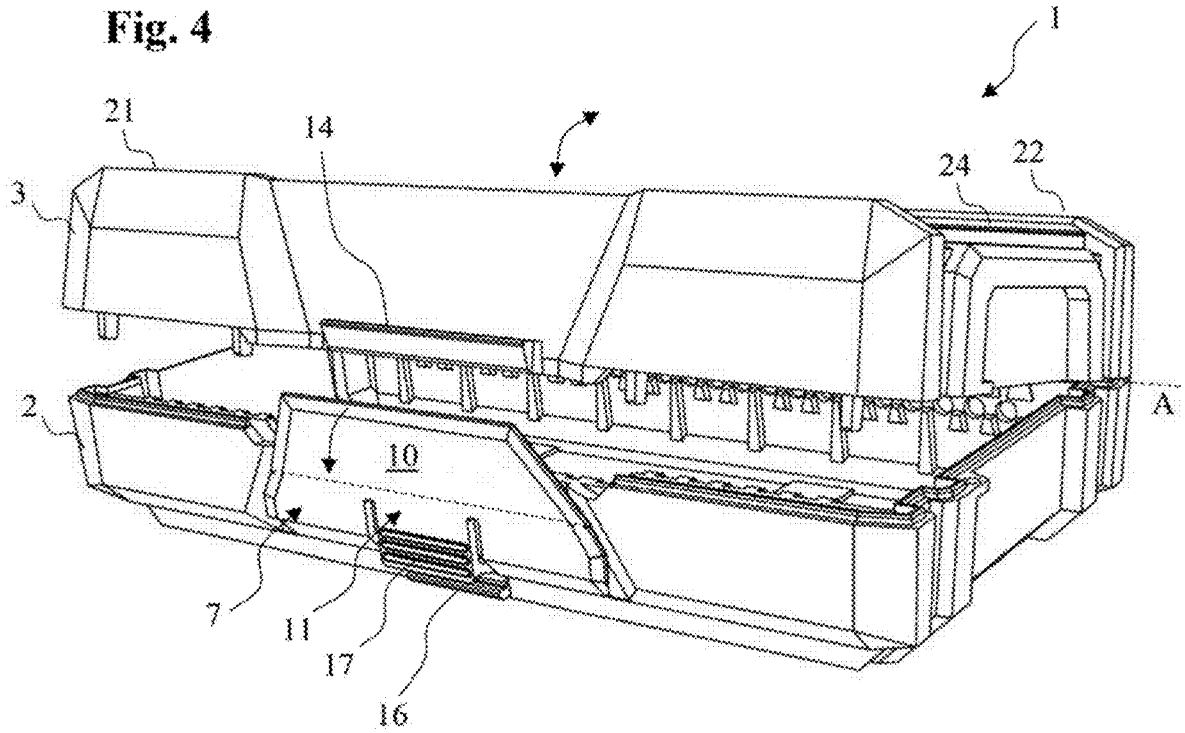
FIG. 4 shows a depiction of the stackable transport container of FIG. 1 in a partially open position.
Figure 5:
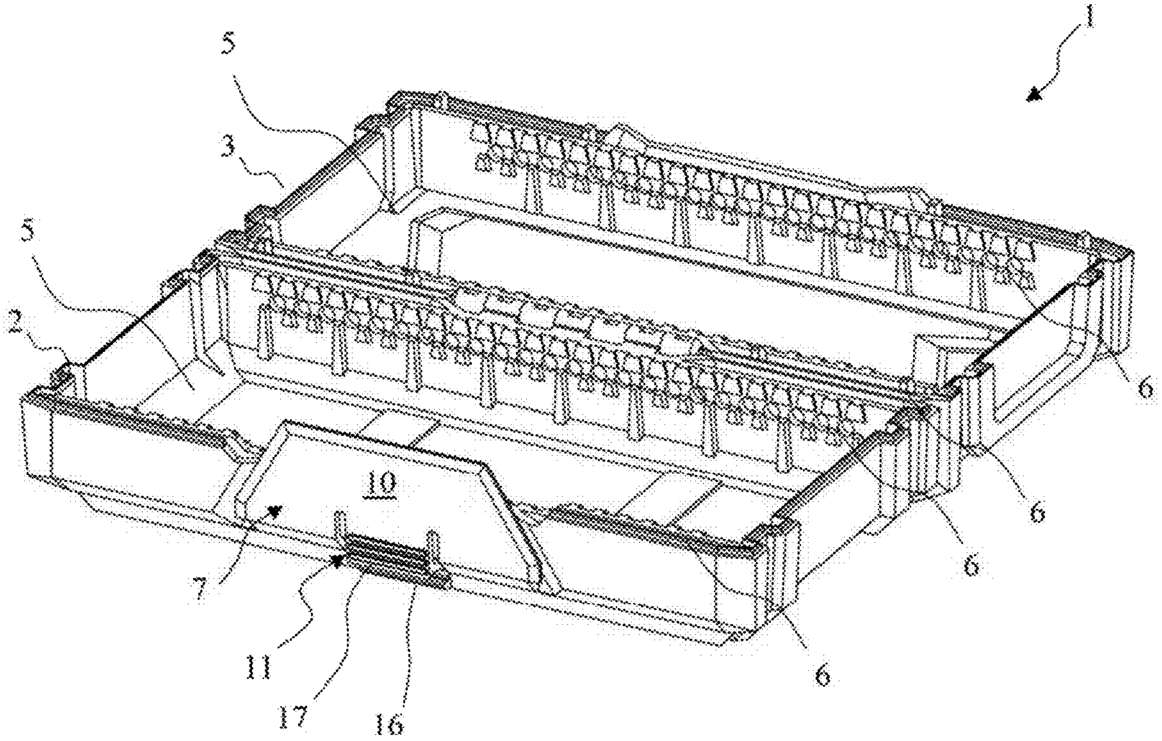
FIG. 5 shows a depiction of the stackable transport container of FIG. 1 in a fully open position.

FIG. 1 through FIG. 3 show different perspective views of an illustrative embodiment of the transport container 1 according to the invention in a closed position. The transport container 1 comprises a lower part 2 as well as an upper part 3, which is connected to the lower part 2 via a hinge 4 arranged on the back of the lower part 2 and upper part 3. In the present illustrative embodiment, a hinge 4 is formed specifically by a steel shaft forming a pivot axis A, which is positioned in guides provided with openings on the back of upper part 3 and lower part 2 shown in FIG. 2. By pivoting the upper part 3 around the pivot axis A, the transport container 1 can be brought from the closed position shown in FIG. 1 to FIG. 3, wherein the upper part 3 rests on the lower part 2, into the fully open position shown in FIG. 5 via the partially open position shown in FIG. 4. As shown in FIG. 5, the lower part 2 and the upper part 3 are configured box- or shell-like, both the lower part 2 and the upper part 3 enclosing a receiving space 5 to accommodate objects therein. In the present illustrative embodiment, the transport container 1 is provided to accommodate tool parts, in particular tool bits. For this purpose, the transport container 1 shown as an example has a number of guide recesses 6 on the insides of the upper and lower parts 3 and 2, in which retaining slots (not shown) used for orderly stowage of tool bits, can be inserted.

Figure 6:
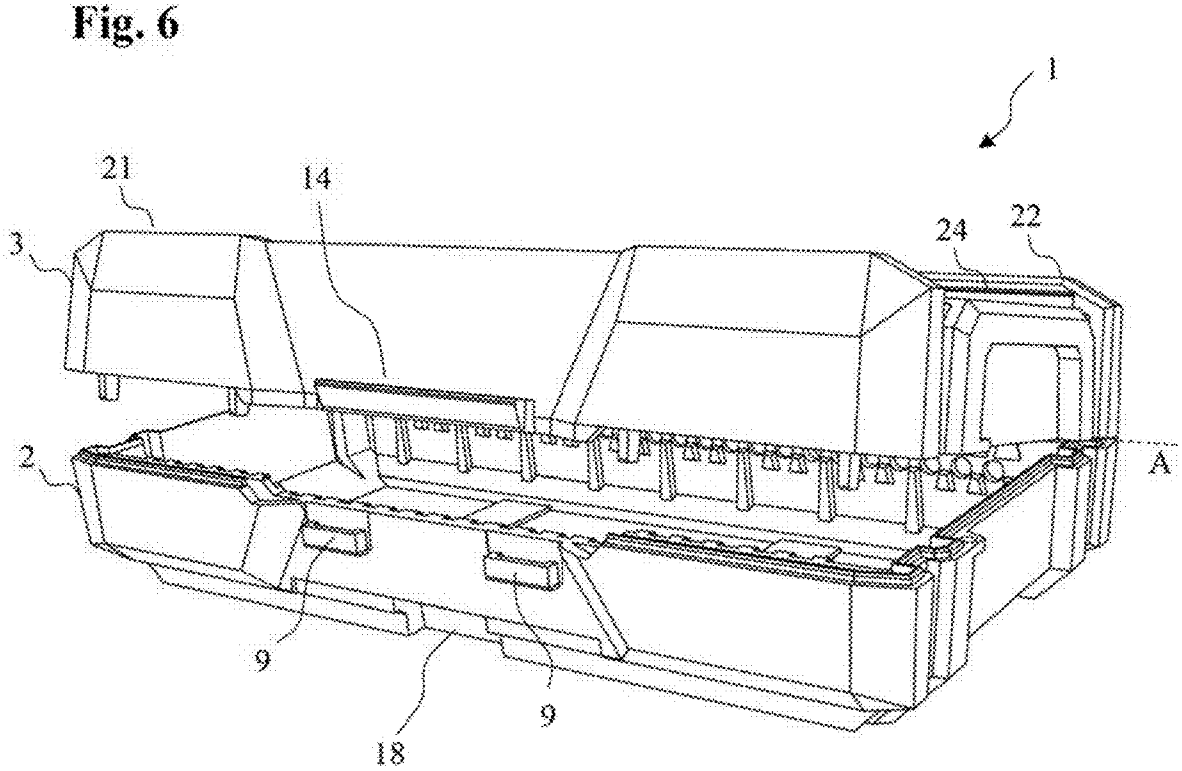
FIG. 6 shows a depiction of the stackable transport container of FIG. 1 in a partially open position, without the securing element mounted on the lower part.
Figure 7:
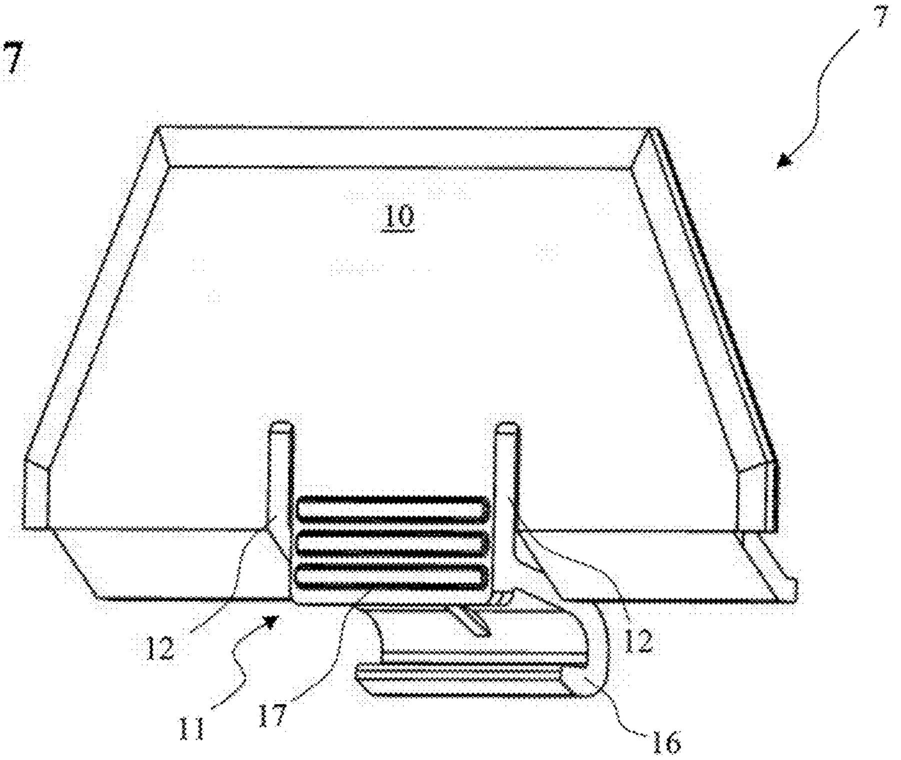
FIG. 7 shows a first depiction of the securing element of the stackable transport container shown in FIG. 1.
Figure 8:
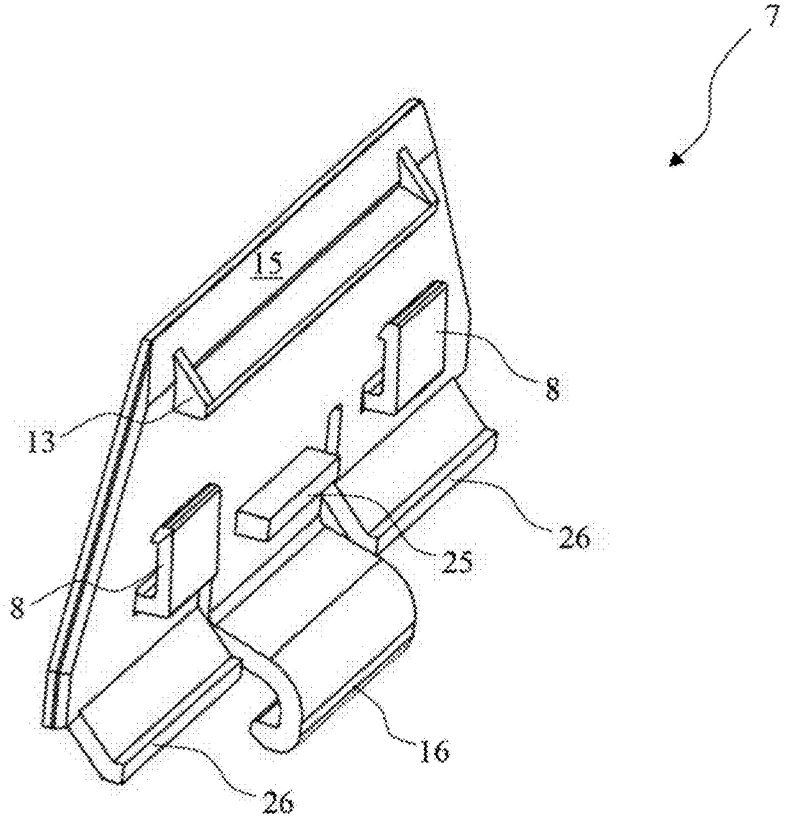
FIG. 8 shows a second depiction of the securing element of the stackable transport container shown in FIG. 1.

A securing element 7, shown in detail in FIG. 7 and FIG. 8, is mounted on the front of lower part 2, via which the upper part 3 (further described below) is secured in the closed position shown in FIG. 1 to FIG. 3, and the transport container 1 (also described further below) is also secured on a support structure, in the present case an equivalent transport container 1. To fasten the securing element 7 on the lower part 2, two fastening hooks 8 are arranged on the back of securing element 7 facing the lower part 2, which are hung or clipped into the fastening recesses 9 on the front of the lower part 2, which are shown in particular in FIG. 6. Positioning of the securing element 7 via the fastening hooks 8 that engage in the fastening recesses 9 is also apparent from the cross-sectional depiction of FIG. 9 and FIG. 10. In the illustrative embodiment shown, the fastening hooks 8 are designed integral with the securing element 7. However, fastening means for positioning the securing element 7 on the lower part 2 are also conceivable, which are subsequently mounted on the securing element 7, for example, made separately and subsequently on the fastening hooks 8 applied to the securing element 7. In an alternative embodiment, it is also conceivable to provide fastening recesses on securing element 7 and fastening hooks on the lower part 2 is also conceivable. The securing element 7 also has an installation bar 25 between the fastening hooks 8, as well as an installation edge 26 arranged beneath each of the fastening hooks 8, which are arranged on or close to the front of lower part 2 of the securing element 7 attached to lower part 2.

To secure the upper part 3 in the closed position shown in FIG. 1 to FIG. 3, and to secure the transport container 1 on a support structure, such as the securing of two stacked transport containers 1, 1' described below with reference to FIG. 11 to FIG. 16, the securing element 7 preferably made of plastic and in one piece, as shown in detail in FIG. 7 and FIG. 8, has two elastically deflectable segments that can be actuated independently of each other. In particular, this securing element 7 has a closure element 10 forming the upper area of the securing element 7, as well as a retaining element 11, which is arranged between two separation slots 12 running vertically from below to about one-third of the height of securing element 7.

Figure 9:
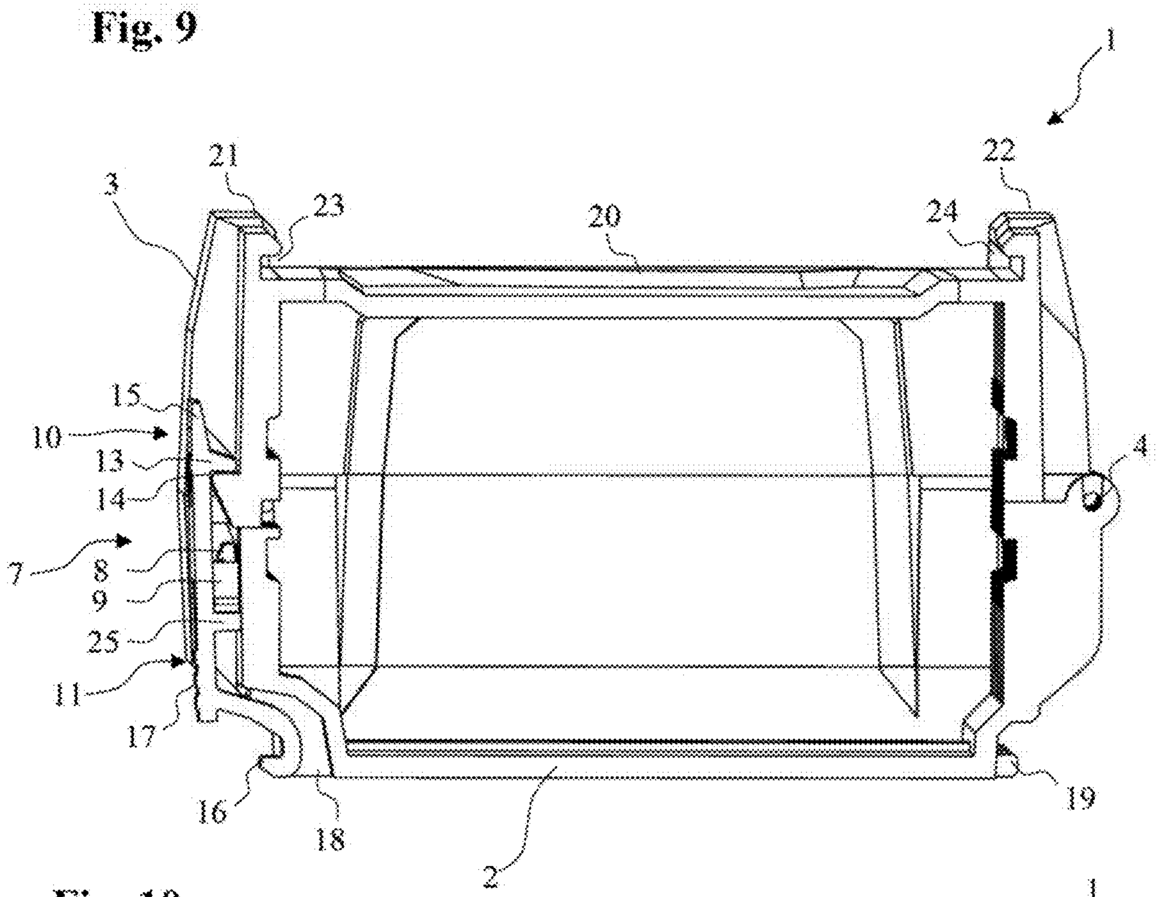
FIG. 9 shows a cross section through the arrangement of FIG. 1, in the area of the securing element.

The closure element 10 has a locking tab 13 on the back facing the lower part 2 and the upper part 3 to secure the upper part 3 in the closed position shown in FIG. 1 to FIG. 3. In particular, the locking tab 13 then engages in a corresponding locking recess 14 on the front of upper part 3 in the closed position forming the base position of closure element 10, as shown in FIG. 9. The locking recess 14 is then in particular a locking strip or locking bar arranged in the area of the lower edge of upper part 3, in particular formed integrally with the upper part 3. To open the transport container 1, the locking tab 13 and the locking recess 14 are disengaged. In particular, the closure element 10 is then deflected outward from the closed position shown in FIG. 9 into the open position shown in FIG. 10 by engagement in an engagement section 15 arranged above the locking tab 13, and by pulling on the closure element 10 outward. Deflection of the closure element 10 is then also shown in FIG. 4 by the dashed line drawn along the securing element 7. As further shown in FIG. 4, the upper part 3 can be pivoted around pivot axis A when the closure element 10 is arranged in the open position, and the transport container 1 can thus be opened. In the absence of any force being applied, i.e., with lack of any engagement in the engagement section 15 and pulling of the closure element 10 outward, the closure element 10 is moved back into the closed position forming the base position. During closure of upper part 3, the locking tab 13 of the closure element 10 arranged in the closed position is initially briefly forced outward by contact with a (lead-in) chamfer beneath the locking recess 14 and then automatically locked into the locking recess 14, in the fully closed upper part 3, by return movement of the elastic closure element 10 into the closed position forming the base position, so that the upper part 3 is secured in the closed position.

Figure 10:
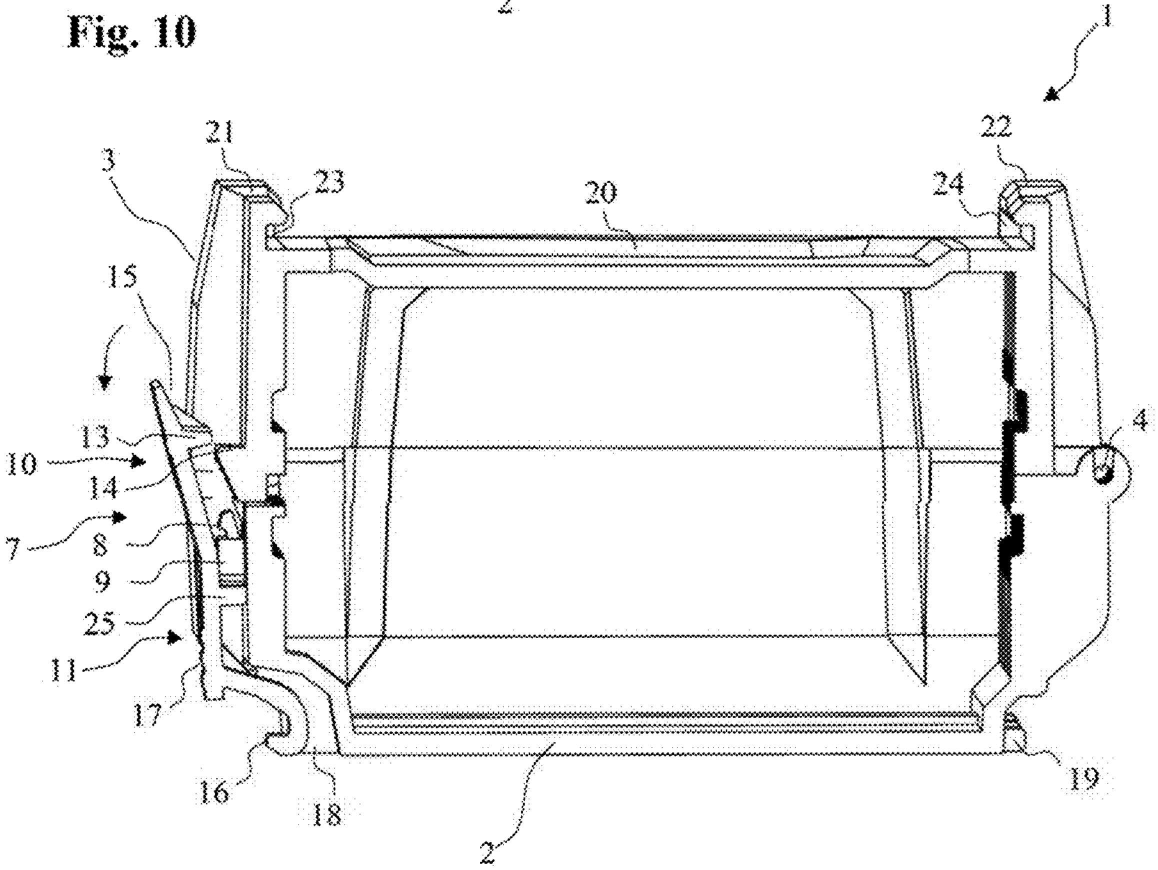
FIG. 10 shows a cross section through the arrangement of FIG. 1, in the area of the securing element with the closure element deflected in the open position.

As also shown in FIG. 10, during actuation of closure element 10, in particular when the closure element 10 is pulled from the closed position outward into the open position, there is no deflection of the retaining element 11. This means that the retaining element 11 remains in the base position during actuation of the closure element 10, as shown in FIG. 9 and FIG. 10.

The retaining element 11 has a locking element 16 forming the lower area of retaining element 11 to secure the transport container 1 on a support structure, which in the present case is designed in the form of locking hook. In the retaining position that forms the base position, the locking element 16 engages in a corresponding retaining recess of the support structure. Securing of the transport container 1 on a support structure and the mode of operation of the retaining element 11 are described below with reference to FIG. 11 to FIG. 16, in the case of securing two transport containers 1, 1' stacked one above the other in a coupled position. Actuation of the retaining element 11 occurs by pressing against an actuation section 17 of the retaining element 11 arranged between separation slots 12. The retaining element 11 is thus deflected in the direction of the transport container 1 and the locking hook 16 (further) is inserted into a recess 18 provided for this purpose in the lower area of lower part 2. The retaining element 11 is moved in the direction of the transport container 1 back into the retaining position forming the base position in the absence of any force being applied, i.e., in the absence of any pressure against the actuation section 17.

As shown in particular in FIG. 2, the transport container 1 has several coupling elements in the form of engagement bars 19, in particular on the lower edge facing the back, which serve for engagement into a corresponding mating element, in particular an engagement recess on the support structure. On the top of the upper part 3, the transport container 1 has two protrusions 21, 22 that extend upward relative to a top surface 20. In particular, the transport container 1 has a first front protrusion 21 arranged on the front and a second rear protrusion 22 arranged on the back. The protrusions 21, 22 then each have an engagement recess 23, 24 open in the direction of the other protrusion 21, 22. The front protrusion 21 has an inward or rearward open front engagement recess 23 and the rear protrusion 22 has an inward or frontward open rear engagement recess 24. The engagement recesses 23, 24, as described below, serve to accommodate the engagement bars 19 as well as the locking element 16 of another equivalent transport container 1 stacked on the upper part 3. The engagement recesses 23, 24 of the present illustrative embodiment are configured as continuous engagement grooves or plug-in strips extending along the top of the upper part 3. However, other embodiments are also conceivable, for example, a subdivision of the engagement recesses 23, 24 into several sections that enable accommodation of the engagement bars 19 and the locking element 16 of an additional equivalent transport container 1.

FIG. 11 to FIG. 16 show the stacking of two identical transport containers 1, 1' described above, one on top of the other along a stacking axis S. The lower part 2 of an upper transport container 1 is then arranged on the upper part 3' of a lower transport container 1'. Not all reference numbers are shown in FIG. 11 to FIG. 16, merely for reasons of better visualization.

Figure 11:
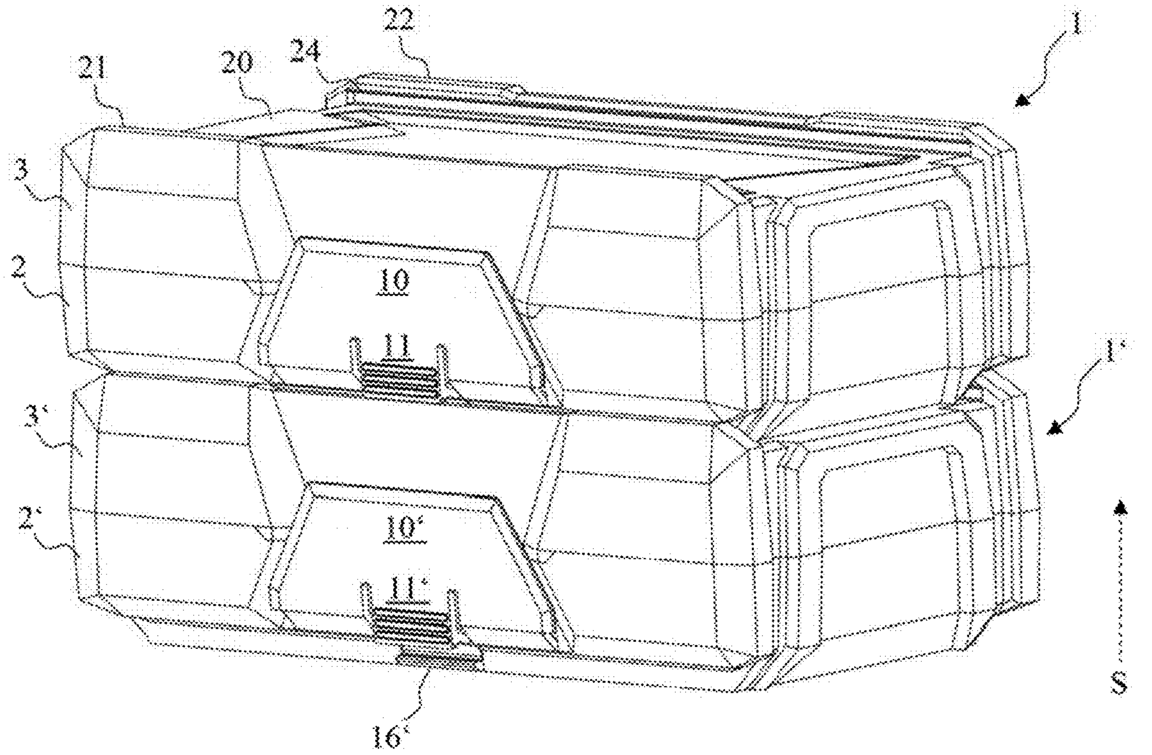
FIG. 11 shows a stacking arrangement of two stackable transport containers in the coupled position.
Figure 12:
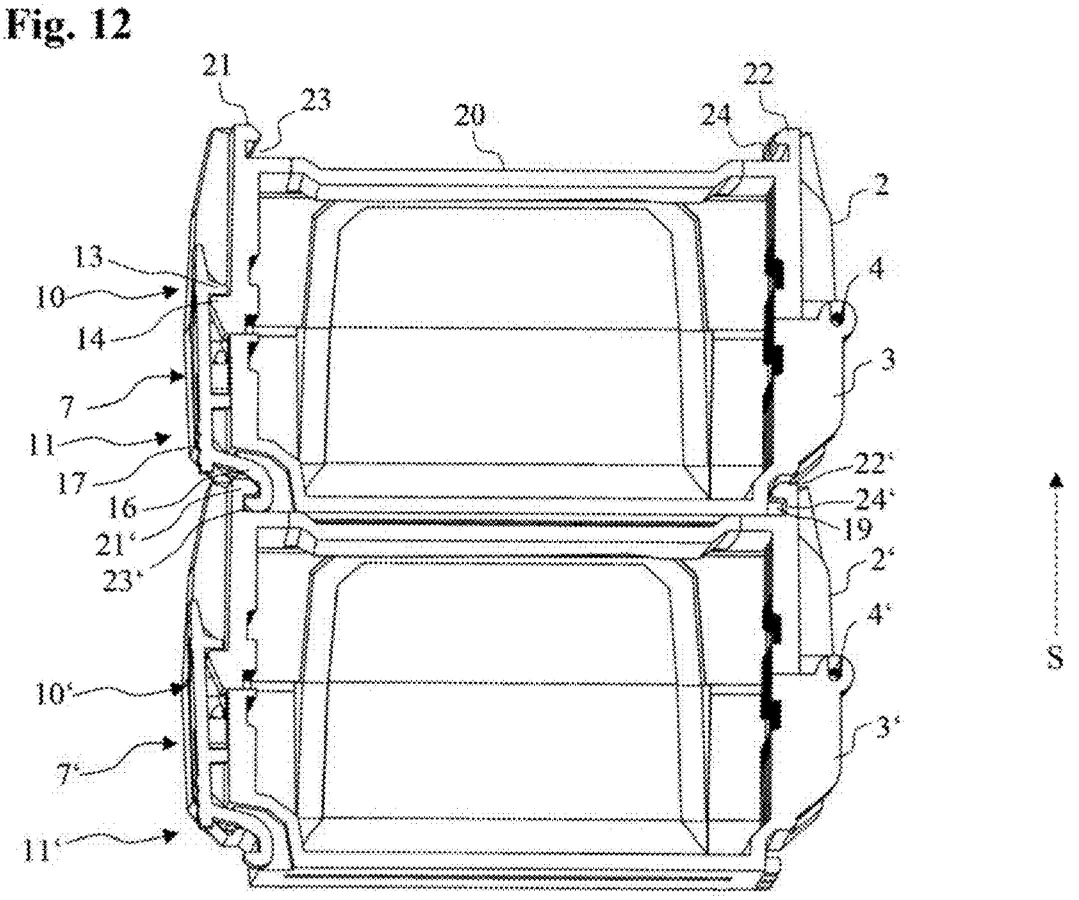
FIG. 12 shows a cross section through the arrangement of FIG. 11.

In order to obtain the stacking of the transport containers 1, 1' in the coupling position shown in FIG. 11 and FIG. 12, in a first step, the engagement bars 19 of the upper transport container 1 are inserted or pushed into the rear engagement recess 24' of the lower transport container 1' while the transport containers 1, 1' are tilted. The front of the upper transport container 1 is then pivoted downward in the direction of the lower transport container 1'. The locking element 16 of the retaining element 11 of the upper transport container 1 in this coupling process initially lies on the top of the front protrusion 21, so that this is briefly deflected inward, i.e., into recess 18. Subsequently, i.e., during complete pivoting of the front of the upper transport container 1 downward into the coupling position shown in FIG. 11 and FIG. 12, the locking element 16 snaps back into the front engagement recess 23' of the lower transport container l' by moving the elastic retaining element 11 into the retaining position forming the base position. Owing to engagement of the engagement bars 19 of the upper transport container 1 in the rear engagement recess 24' of the lower transport container l' and engagement of the locking elements 16 in the front engagement recess 23', the two stacked transport container 1, 1' are arranged in the coupling position secured against being lifted off or loosened from each other. In addition to the stacked arrangement of the transport containers 1, 1' shown by way of example in FIG. 11 and FIG. 12 in the depicted configuration of the transport containers 1, 1', in particular because of the mirror symmetry of the engagement recesses 23', 24', which can serve both for accommodating the engagement bars 19 and the locking element 16, stacking of the two transport containers 1, 1' rotated by 180° is also possible, namely in such a way that the engagement bar 19 of the upper transport container 1 engages in the front engagement recess 23' of the lower transport container 1 and the locking element 16 in the rear engagement recess 24'.

Figure 13:
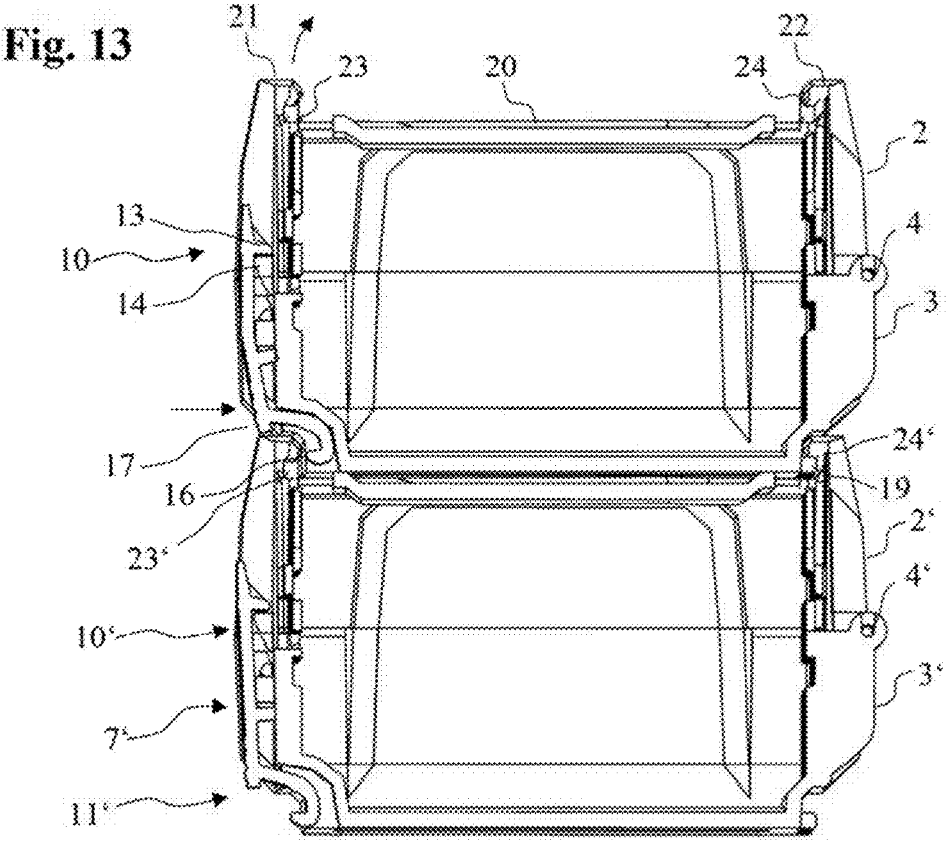
FIG. 13 shows a cross section through the arrangement of FIG. 11, wherein the retaining element of the upper transport container is arranged in the release position.

Loosening of the two stacked transport containers 1, l' is shown in FIG. 13, in particular by the drawn arrows. The retaining element 11 is deflected from the retaining position shown in FIG. 12 into the release position shown in FIG. 13 by pressing on the actuation section 17 so that the locking element 16 is disengaged from the front engagement recess 23' of the lower transport container 1'. In this arrangement of the retaining element 11, the upper transport container 1 can be raised from the lower transport container 1'. In particular, the front of the upper transport container 1 is initially moved upward or away from the lower transport container l' and the engagement bars 19 are then guided out of the rear engagement recess 24'. As shown in FIG. 13, the closure element 10 of securing element 7 of the upper transport container 1 remains in the closed position forming the base position during actuation of retaining element 11. The upper transport container 1 therefore does not open unintentionally when decoupling from the lower transport container 1'.

Figure 14:
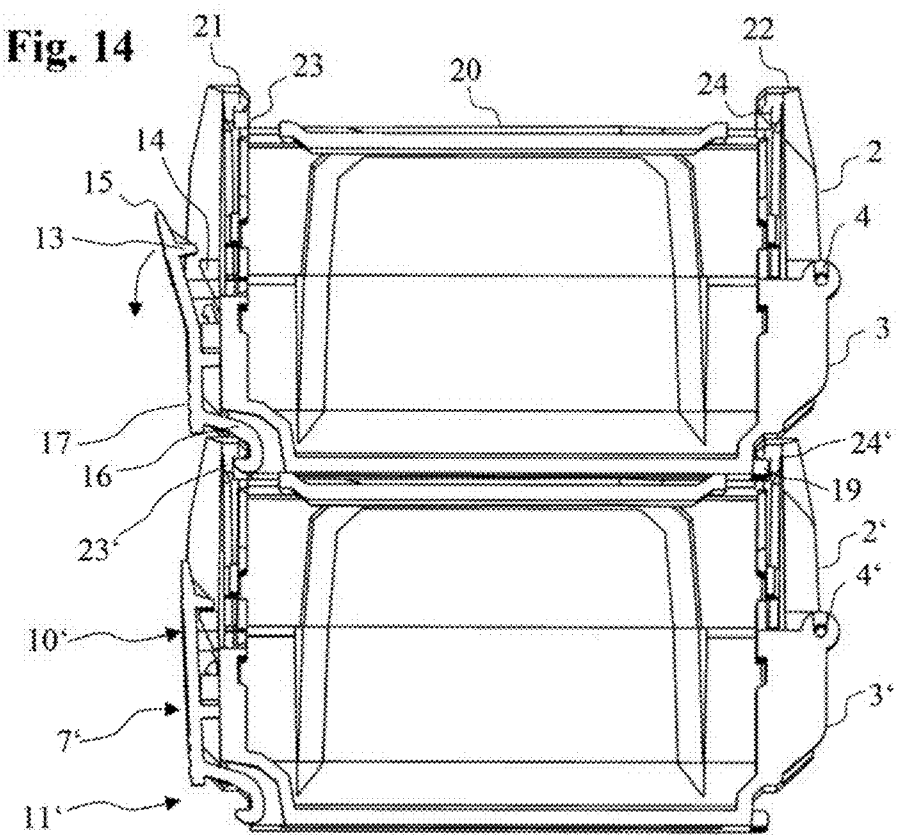
FIG. 14 shows a cross section through the arrangement of FIG. 11, wherein the closure element of the upper transport container is arranged in the open position.
Figure 15:
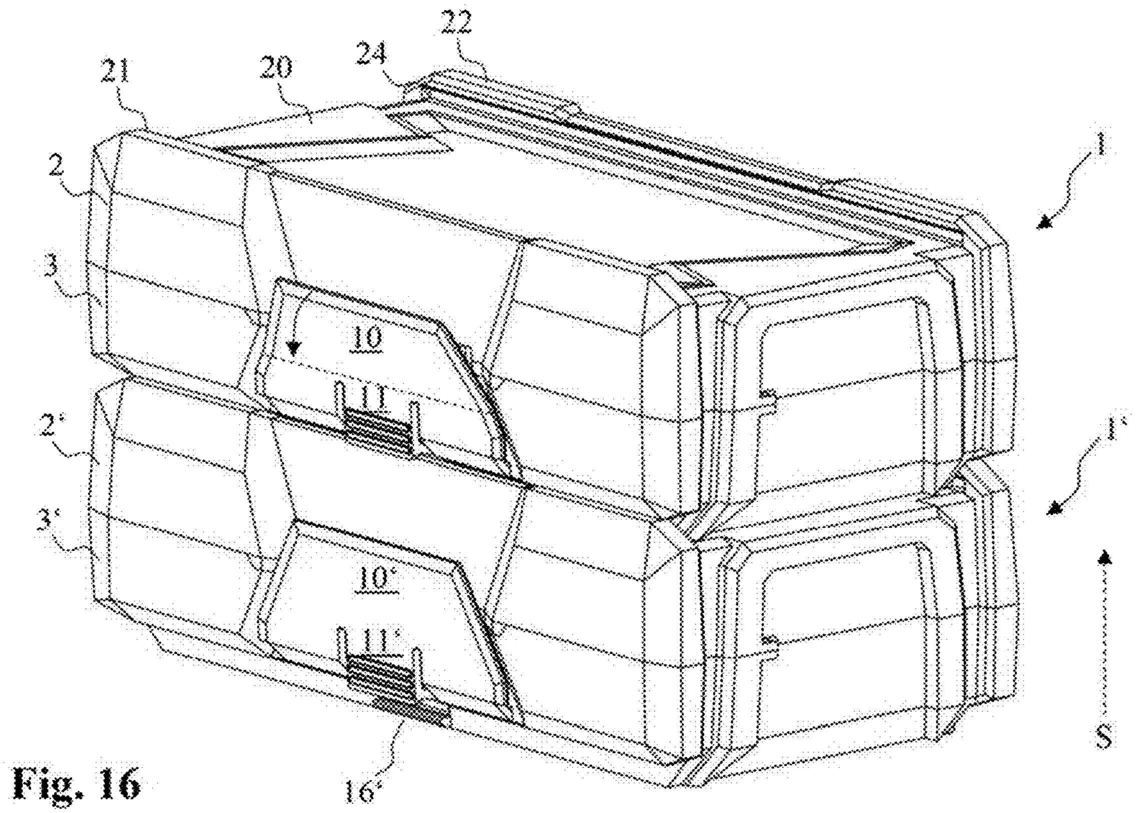
FIG. 15 shows a perspective view of the stacking arrangement of FIG. 11, wherein the closure element of the upper transport container is arranged in the open position.
Figure 16:
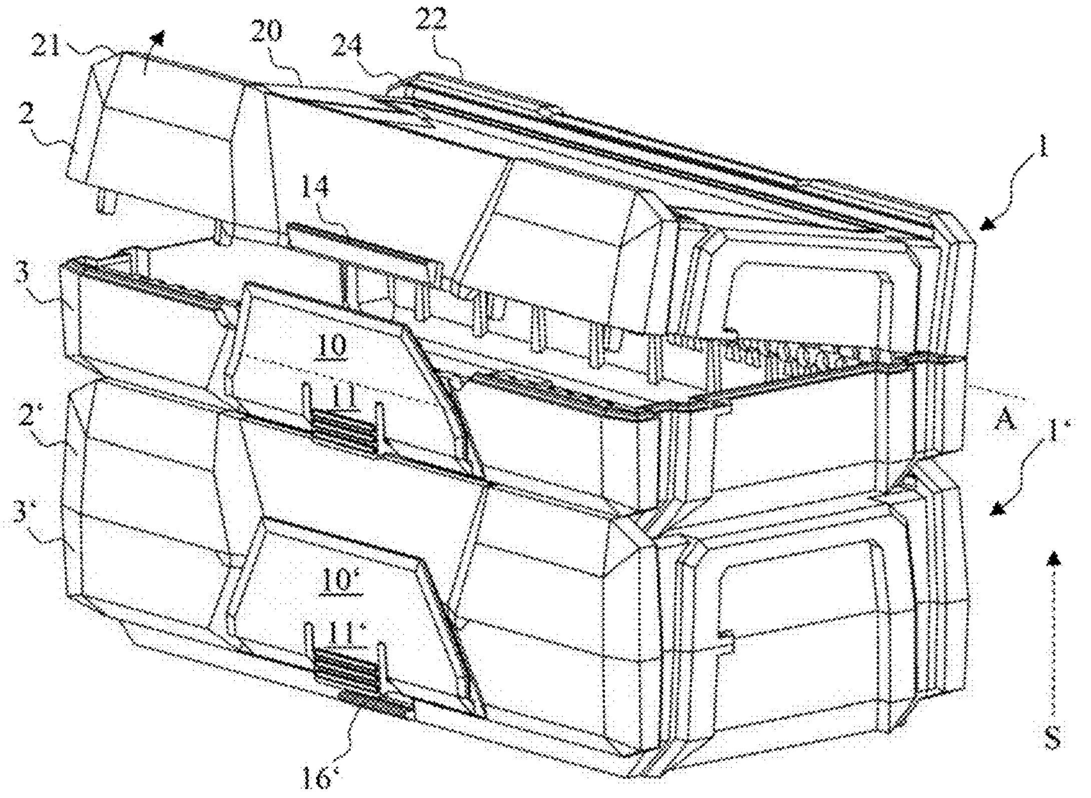
FIG. 16 shows a perspective view of the stacking arrangement of FIG. 11 with the upper part of the upper transport container in a partially open position.

FIG. 14 to FIG. 16 show the opening of the upper transport container 1 when arranged on the lower transport container 1'. The closure element 10 is then deflected outward into the open position shown in FIG. 14 and FIG. 15 by engagement in the engagement section 15 and by pulling the closure element 10 outward, and then the upper part 3, as shown in FIG. 16, is pivoted upward around pivot axis A. As also already described above, the retaining element 11 of the securing element 7 then remains in its retaining position forming the base position, so that the upper transport container 1 is not released from the lower transport container 1' during the described opening.

In the interest of completeness, it is pointed out that the invention is not restricted to the embodiment described above by way of example. For example, in addition to the depicted coupling of two equivalent transport containers, it is also possible to attach a transport container to an adapter plate having the equivalent but not identical support structure. It is also possible to provide differently configured engagement bars, as well as more or fewer engagement bars or other coupling elements as well as a different configuration of the engagement recesses. In principle, it is also conceivable to design a transport container having several securing elements.

REFERENCE NUMBERS

1 Transport container
2 Lower part
3 Upper part
4 Hinge
5 Receiving space
6 Guide recesses
7 Securing element
8 Fastening hook
9 Fastening recess
10 Closure element
11 Retaining element
12 Separation slot
13 Locking tab
14 Locking recess
15 Engagement section
16 Locking element
17 Actuation section
18 Recess
19 Engagement bar
20 Top surface
21 First, front protrusion
22 Second, rear protrusion
23 First, front engagement recess
24 Second, rear engagement recess
25 Installation bar
26 Installation edge
A Pivot axis
S Stacking axis

The invention claimed is:

1. A transport container for releasable mounting on a support structure, the transport container having a lower part, an upper part, which encloses a receiving space together with the lower part and is pivotably connected to the lower part via a hinge, a closure element movable between a closed position and an open position for releasable securing of the upper part in a position that closes off the receiving space, as well as a retaining element movable between a retaining position and a release position, via which the transport container can be fixed in a coupled position wherein an underside of the lower part is arranged on the support structure, wherein the closure element and the retaining element are segments of a securing element arranged on the lower part that can be actuated independently of each other, wherein the closure element is elastically deflectable from the closed position forming a closure element base position, and has a locking tab for engagement in a locking recess of the upper part and wherein the retaining element, which is elastically deflectable from the retaining position forming a retaining element base position, has a locking element for releasable engagement in a retaining recess of the support structure in the coupled position of the transport container.

2. The transport container according to claim 1, wherein the hinge is arranged on a first side of the lower part for closing or opening the receiving space, and the securing element is arranged on a second side of the lower part.

3. The transport container according to claim 2, wherein the hinge is arranged on a back of the lower part and the securing element is arranged on a front of the lower part opposite the back.

4. The transport container according to claim 1, wherein the securing element is made in one piece.

5. The transport container according to claim 1, wherein the closure element and the retaining element are arranged on opposite sides of the securing element, wherein the locking tab is arranged on or near a top of the securing element and the locking element is arranged on or near the underside of the securing element.

6. The transport container according to claim 1, wherein the retaining element is arranged between two vertically running separation slots of the securing element.

7. The transport container according to claim 1, wherein the securing element is rigidly connected to the lower part.

8. The transport container according to claim 1, wherein the securing element is mounted releasably on the lower part via at least one fastening device, wherein the at least one fastening device includes a fastening hook arranged on the securing element and/or the lower part and a fastening recess for the fastening hook arranged on the lower part and/or the securing element.

9. The transport container according to claim 1, wherein the securing element is mounted on the lower part via two fastening devices, wherein the retaining element is arranged between the at least two fastening devices.

10. The transport container according to claim 1, wherein the closure element has an engagement section for pulling the closure element outward from the closed position into the open position.

11. The transport container according to claim 1, wherein the retaining element has an actuation section to force the retaining element from the retaining position into the release position.

12. The transport container according to claim 1, wherein the underside of the lower part has at least one engagement bar which is coupled to an engagement recess of the support structure when in the coupled position.

13. The transport container according to claim 12, wherein the at least one engagement bar is arranged near the hinge of the lower part.

14. The transport container according to claim 13, wherein the at least one engagement bar comprises a plurality of engagement bars which are arranged along an edge of the underside of the lower part in the area of the hinge.

15. The transport container according to claim 1, wherein the top of the upper part has a support structure designed for stacking an equivalent transport container thereon.

16. The transport container according to claim 1, wherein a top of the upper part includes at least two protrusions comprising a front protrusion arranged on or near a front of the upper part and a rear protrusion arranged on or near a back of the upper part, each protrusion forms at least one engagement recess, the front protrusion extends toward the rear protrusion, the rear protrusion extends toward the front protrusion.

17. A container arrangement comprising the transport container according to claim 1 and a support structure having a retaining recess for releasable mounting of the transport container thereon.

18. The container arrangement according to claim 17, wherein the support structure is located on a second transport container or an adapter plate.

* * * * *